United States Patent [19]

Hartley

[11] Patent Number: 5,104,063
[45] Date of Patent: Apr. 14, 1992

[54] AIRCRAFT LANDING GEAR PREROTATION SYSTEM

[76] Inventor: James M. Hartley, 1831 Pennsylvania St., Columbus, Ind. 47201

[21] Appl. No.: 515,410

[22] Filed: Apr. 27, 1990

[51] Int. Cl.$^5$ ............................................. B64C 25/32
[52] U.S. Cl. ............................. 244/103 S; 244/103 R
[58] Field of Search ........................ 244/103 R, 103 S

[56] References Cited

U.S. PATENT DOCUMENTS

| | | | |
|---|---|---|---|
| 2,320,547 | 6/1943 | Tiger | 244/102 |
| 2,338,699 | 1/1944 | Wilhoit et al. | 244/103 S |
| 2,399,218 | 4/1946 | Felburg | 244/103 |
| 2,413,924 | 1/1947 | Knox | 244/1 |
| 2,414,849 | 1/1947 | Beazley | 244/103 |
| 2,481,600 | 9/1949 | Knox | 88/1 |
| 2,665,087 | 1/1954 | Clover | 244/103 S |
| 3,428,274 | 9/1966 | Ellis et al. | 244/103 S |
| 3,542,318 | 11/1970 | Ellsworth | 244/103 S |
| 3,741,503 | 6/1973 | Cabeza | 244/103 |
| 3,773,283 | 11/1973 | Abplanalp | 244/103 |
| 3,797,786 | 3/1974 | House | 244/103 |
| 3,814,354 | 6/1974 | Reese | 244/103 |
| 3,850,389 | 11/1974 | Dixon | 244/103 |
| 3,866,860 | 2/1975 | Opitz, Sr. | 244/103 |
| 3,936,016 | 3/1976 | Shiber | 244/103 |
| 4,040,582 | 8/1977 | Krauss | 244/103 |
| 4,061,294 | 12/1977 | Hawkins | 244/103 |
| 4,205,812 | 6/1980 | McSweeney | 244/103 |
| 4,244,513 | 1/1981 | Fayer et al. | 388/809 |
| 4,305,025 | 12/1981 | Arnold | 388/809 |
| 4,383,665 | 5/1983 | Maclean et al. | 244/103 |
| 4,385,739 | 5/1983 | Soderberg | 244/103 |
| 4,491,288 | 1/1985 | Sinclair | 244/103 |
| 4,615,498 | 10/1986 | Ochiai | 244/103 |
| 4,659,039 | 4/1987 | Valdes | 244/103.5 |
| 4,659,040 | 4/1987 | Sinclair | 244/103 |
| 4,732,350 | 3/1988 | Lamont | 244/103 |

FOREIGN PATENT DOCUMENTS 580313 8/1958 Italy .................................. 244/103 S
0004505 11/1984 PCT Int'l Appl. ............. 244/103 S

OTHER PUBLICATIONS

Airplane Accessory Kit No. AAK 78-5A description sheet, undated.
"Wheel-Nose Conversion Kit" advertisement in *Aerospace and Defense International Product News*, May/Jun. 1990.

Primary Examiner—Joseph F. Peters, Jr.
Assistant Examiner—Christopher P. Ellis
Attorney, Agent, or Firm—Woodard, Emhardt, Naughton, Moriarty & McNett

[57] ABSTRACT

A device to induce rotation of aircraft landing wheels is disclosed, using only the force of oncoming air to bring them up to synchronous ground (landing) speed during approach to landing. A complete, independently operating system with its own sensors, microcontroller, motors and control linkages, which does not interface with any of the aircraft's instumentation or systems, continually measures the actual ground speed of the aircraft during final approach, transmitting this flow of data to a microcontroller for continuous translation into required RPM for each tire diameter and monitors the precise RPM of each landing wheel through non-contact photo-tachometers whose outputs are multiplexed into the microcontroller. The system provides continuous control over the RPM of each landing wheel through air intake ducts with servo motor driven inlet vanes gating incoming air to the wheel-mounted impellers. An independent servo control loop for each wheel have their error signal and null point derived, through comparator logic and multiplexing, from the difference between instantaneous wheel RPM and ground-speed-based target RPM.

23 Claims, 11 Drawing Sheets

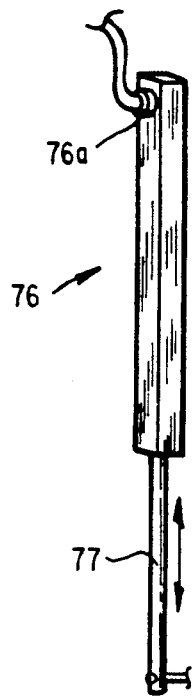
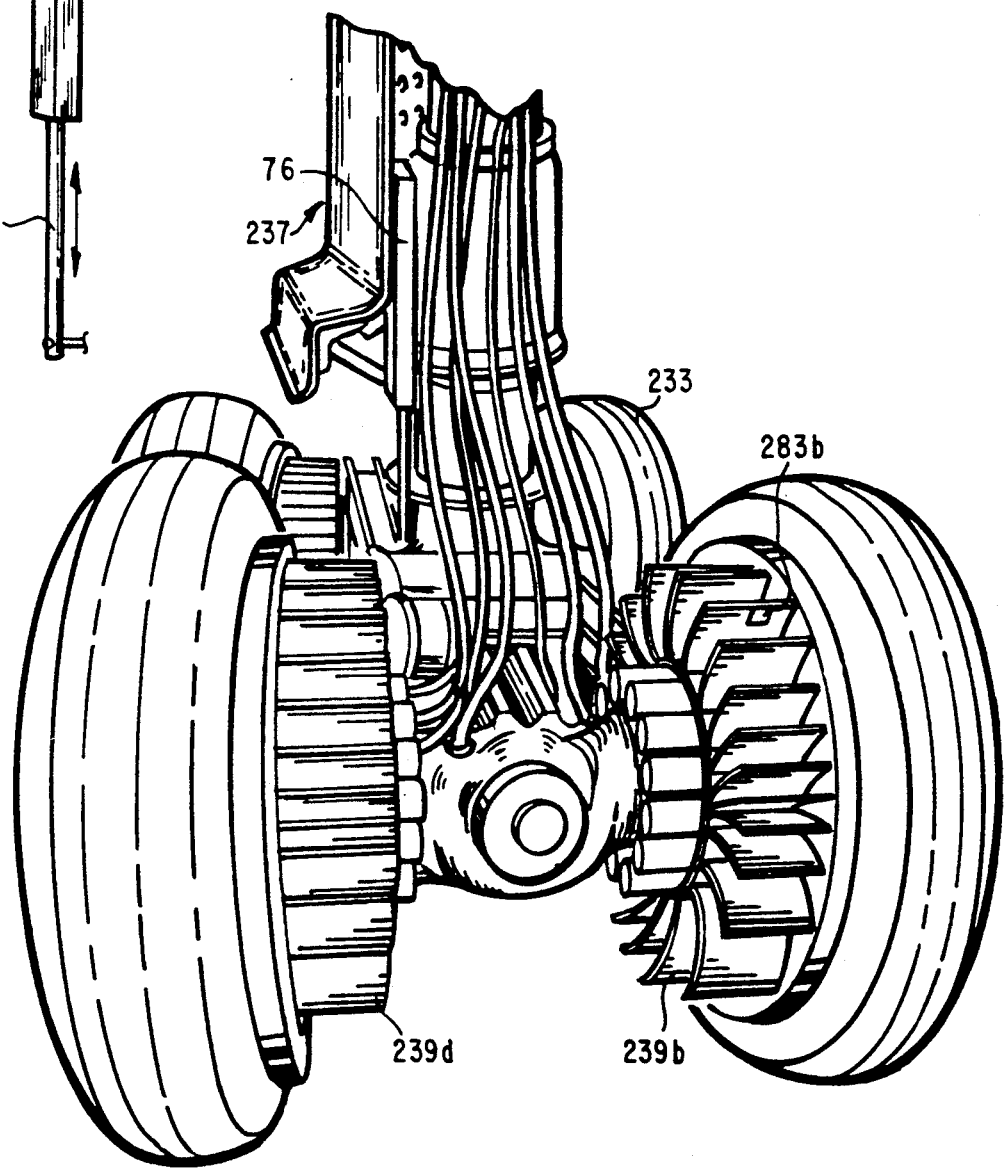
Fig. 12B
Fig. 12A

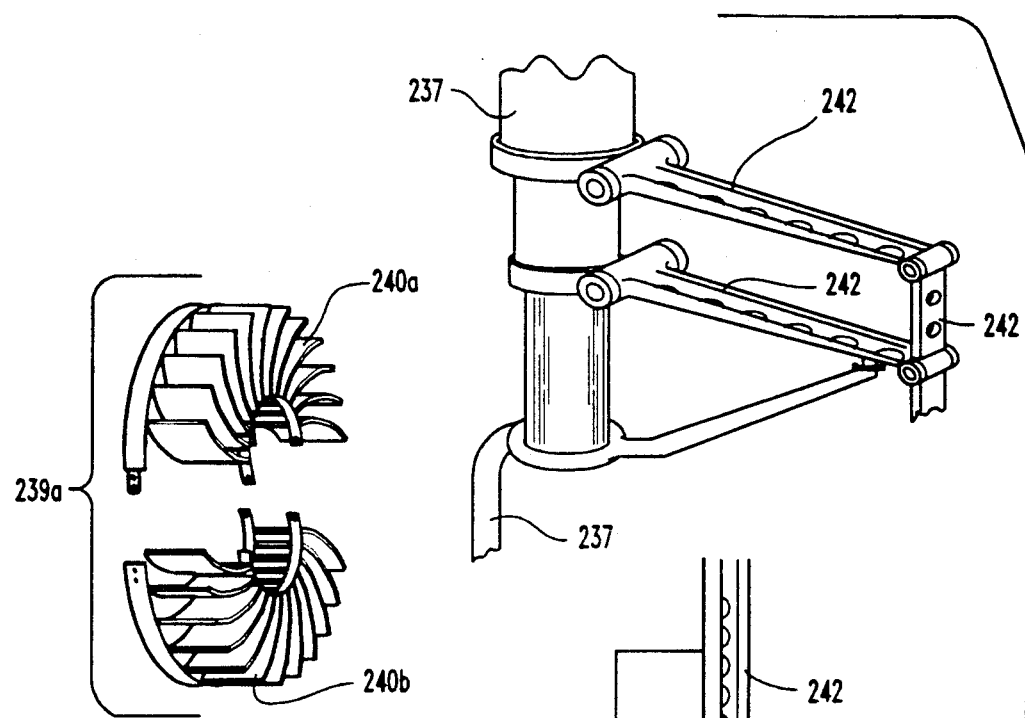
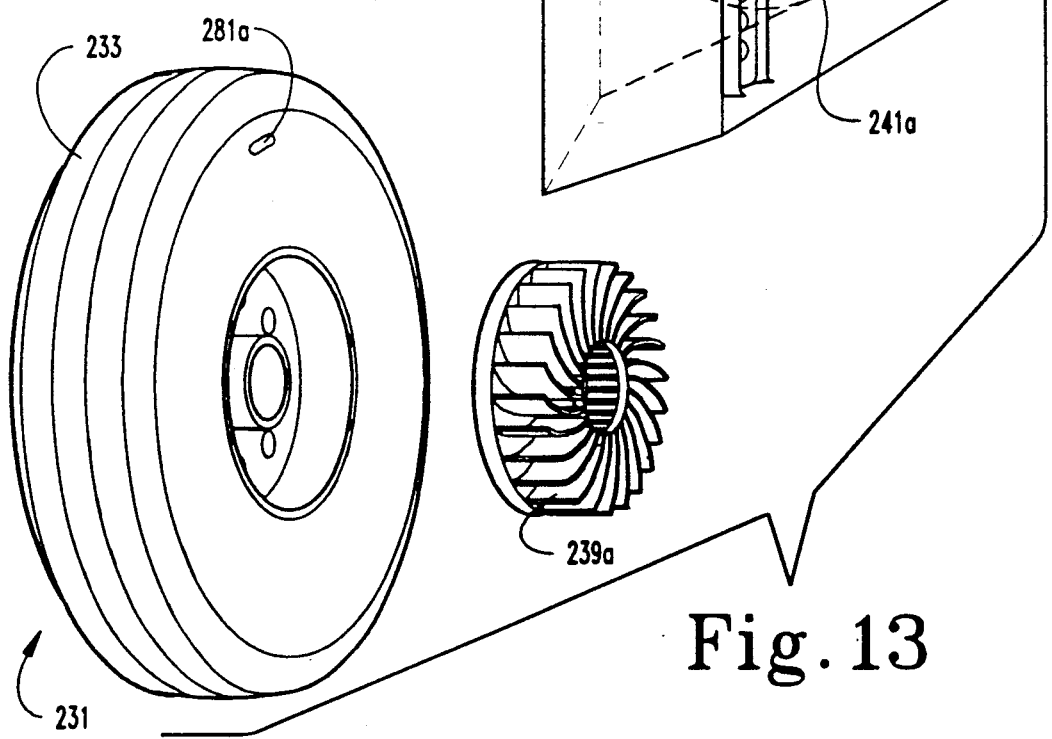
Fig. 14
Fig. 13

AIRCRAFT LANDING GEAR PREROTATION SYSTEM

BACKGROUND OF THE INVENTION

The present invention relates generally to aircraft landing gears, and more specifically to systems for prerotating the landing gear wheel prior to landing.

Many patents have been issued to date relating generally to aircraft landing wheel prerotation devices and schemes. Extending back as far as the 1920's, many of these patents should be viewed in light of the sizes and speeds of airplanes contemporary with those devices. With today's aircraft typically being vastly larger, heavier and faster, many of those devices of yesteryear would self-destruct if used in their patented form.

Notwithstanding this veritable avalanche of attention and patent coverage, it is this inventor's understanding that no commercial or other implementation of any such prerotation device has come about at this time, reflecting a long felt but unsolved need in this art.

Generally, past inventors' work, as evidenced by their patents, falls into three categories: 1) prerotation induced by affixing some manner of air-catching appendage to the aircraft wheel and/or modifying the wheel itself to act as an impeller; 2) prerotation requiring some manner of electric or mechanical power from the aircraft itself, transmitted to the landing wheels through some form of mechanism, power train or linkage; or 3) prerotation induced by modification of the aircraft tire by air-catching appendages bonded to the tire sidewalls or molded integrally with the tire. Some of the air-driven types included a baffle or a tube to cause more air to impinge upon these appendages.

One patent, however, Opitz U.S. Pat. No. 3,866,860, 1975, consisted of a sort of fender enclosing the upper half of the aircraft wheel so that only the lower half would be exposed to the airstream, thereby encouraging some rotation through the friction of the passing air. Others, including Pogue, U.S. Pat. No. 2,072,277, 1937, suggested a sort of caterpillar tractor-like appendage with a flexible belt traveling around several rollers. Livermon, U.S. Pat. No. 2,467,140, 1949, proposed to use explosive charges timed to explode into cavities on the wheels just before touchdown to produce rotation.

Without going into critical detail, this inventor would venture the comment vis-a-vis Prior Art, that many of the devices show an apparent lack of consideration of the magnitude of the actual forces, masses and speeds involved in inducing adequate prerotation of the massive wheels and tires used on the landing gear of today's aircraft.

In most instances, the desirability of prerotation was reiterated in a general way, but numerous specifics of the actual problem and task were not dealt with. It is the judgment of this inventor that any mechanical connection between the aircraft wheel and any prerotation device is highly vulnerable to damage or destruction and consequent damage to the aircraft tires if the induced prerotation RPM deviates sufficiently from the forced RPM which will begin immediately upon touchdown; yet no patented device studied by this inventor appears to provide actual means to achieve, confirm, and sustain true synchronous rotation.

Inasmuch as the exact instant of landing-wheel touchdown contact cannot be precisely known in advance, and inasmuch as the ground speed of the aircraft is decreasing continuously during final approach, it will be seen that the achievement of exact synchronism between tires and runway can only be realized by defining a "window of time" which begins early enough to contain, with certainty, the moment of touchdown; and from the beginning of which an actual measured synchronism will be achieved and maintained, accurately and continuously tracking ground speed and adjusting RPM to conform to it. Depending upon aircraft size and landing speeds, number of and weights of wheels, load and other variables, such a window of time may typically be regarded as beginning sixty to ninety seconds after lowering of landing wheels, and in virtually all cases thirty to sixty seconds before the expected moment of touchdown, and terminating only after all landing wheels are on the ground rolling, including the all-important nose wheel(s).

The smooth jolt-free landings which sychronous prerotation of aircraft landing wheels can provide is long overdue. Regardless of how heavy, massive and well-braced the landing gear assemblies of large aircraft may be, the severe jolt and shock of these landing gear holding their 500-lb. tires as they ease down to the concrete runway hanging static, at zero RPM, and are revved up by sheer brute force to a sudden 1,100 RPM in the space of half a second, is a jolt which almost certainly transmits damaging recoil forces throughout the entire frame of the aircraft. Fatigue of metals is almost sure to result, because of the magnitude of the forces involved and the extreme shortness of time.

Under these conditions, the wheel balancing so familiar to motorists, and so important to tire life are difficult to maintain beyond the first landing, for the smoky cloud of rubber trailing out beyond the rudders of our large aircraft during this critical half-second are burned-off parts of the $1,000 tires. As a result of this destructive abrasion, aircraft tires today have a useful life of about 125 landings before being replaced or recapped. These 125 landings figure out to less than 1,000 ground miles per tire, of which only about half are torque (braking) miles and the rest are rolling miles. This compares poorly with the typical life of truck tires of roughly the same size which commonly travel 25,000 to 30,000 miles before replacement. For safety as well as economy and longer tire life, prerotation is long overdue.

The very substantial safety benefit and major savings in tire costs arising out of use of the prerotation system would seem to make it a desirable alternative to the destructive abuse of several $1,000 400-lb. aircraft tires.

While the Prerotation Control System as outlined is envisioned as being developed and produced to be retrofitted on a wide range of existing aircraft with little or no minor modification of them, it is also a system which could be made available to aircraft manufacturers for incorporation into new and future aircraft.

SUMMARY OF THE INVENTION

The present invention provides a system for prerotating a aircraft's landing gear wheel prior to landing, comprising at least one landing gear wheel attached to the aircraft by a support; means for measuring the true ground speed of the aircraft independently from the aircraft's airspeed; and means for rotating the wheel at selective revolutional speeds while the aircraft is airborn. Also provided are means for measuring the revolutional speeds of the wheel; and control means for operating the means for rotating the wheel. The control means are responsive to the means for measuring the true ground speed and responsive to the means for measuring the revolutional speeds of the wheel, wherein the control means operates the means for rotating to selectively increased and decreased revolutional speeds of the wheel to correspond to the true ground speed. The wheel has an impeller attached thereto, and the means for rotating the wheel comprises a duct having a forward air intake and an air outlet, the outlet being directed towards the impeller to rotate the wheel, the duct having a variable gate therein to regulate airflow through the duct onto the impeller, the gate being openable by power means responsive to the control means, wherein the airflow through the duct and the rotational speed of the wheel is increased by increased opening of the variable gate.

The present invention also provides a prerotation system in which means for measuring the revolutional speeds of the wheel are provided which comprises a reflective area on the tire and a non-contact photo-sensor mounted apart from the wheel to generate an r.p.m. signal, such as a photo-tachometer.

The present invention also provides a prerotation system in which variable gates are provided which comprise a pair of oppositely disposed doors at the intake.

One object of the present invention is to provide an improved aircraft landing gear prerotation system.

Another object of the present invention is to reduce wear and damage to aircraft landing gear tires. Another object of the present invention is to improve safety in aircraft landing gear systems.

These and other objects are apparent from the drawings and written description.

BRIEF DESCRIPTION OF THE DRAWINGS

FIG. 12A is a rear perspective view of the device of FIG. 11.

FIG. 12B is a perspective detail view of the LVDT illustrated in FIG. 12A.

FIG. 13 is an exploded, partial view of the device of FIG. 9 showing a support, a wheel, an impeller and an intake duct.

FIG. 14 is a perspective detail view of the impeller assembly of FIG. 13.

DESCRIPTION OF THE PREFERRED EMBODIMENT

Figure 1:
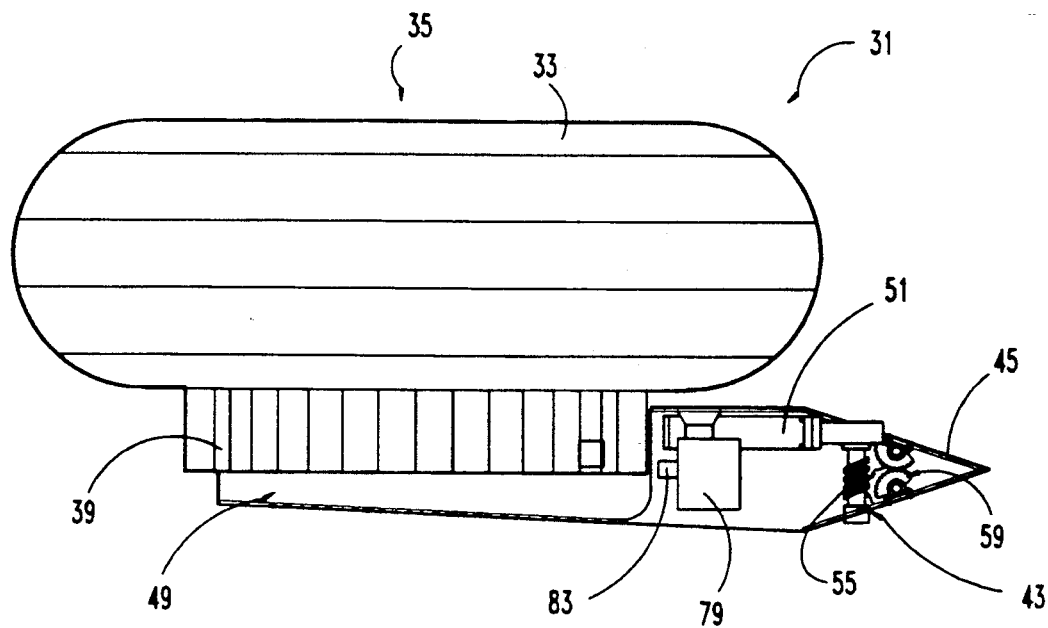
FIG. 1 is a top plan view of a first embodiment of the present invention, partially cut away for drawing clarity.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 8:
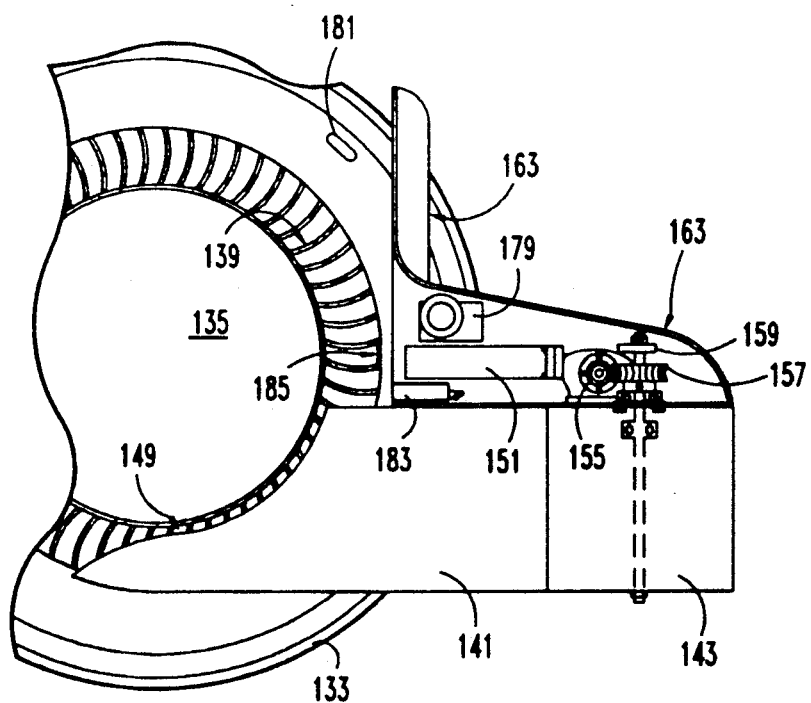
FIG. 8 is a partial side elevational view of a second embodiment of the present invention having an alternate impeller configuration and an alternate duct, partially cut away for drawing clarity.

Referring to the drawing FIGS. 1-14, three embodiments of the present invention are illustrated. The first embodiment is illustrated in FIGS. 1-7; the second embodiment is illustrated in FIG. 8; and, the third embodiment is illustrated in FIGS. 9-14. The control system and the control panel illustrated in FIGS. 15 and 16 may be utilized with any of the embodiments. The reference numbers between the three embodiments have been designated generally so related parts have similar reference numbers except for the hundredths digit. For example, in the first embodiment, the impeller has reference number "39", in the second embodiment the impeller has reference character "136", and in the third embodiment the four impellers have reference characters "239a", "239b", "239c" and "239d". The following written descriptions describe these embodiments based on the following general topics: Mechanical, Electromechanical, Sensors, and Instrumentation.

A. MECHANICAL

The present invention provides an impeller 39 having a plurality of equally-spaced concave turbine blades, suitably mounted on each landing wheel 31 of the aircraft—specifically including the nose-wheel(s); so mounted by a support (see e.g. support 237 in FIGS. 10-13) that the concave surfaces of impeller 39's turbine blades face forward while on the lower half of their rotation on wheel 31. Wheel 31 includes tire 33 and hub 35 supported by a support, such as a landing gear strut to the airplane as is well known.

Depending upon available space in the wheel cavity and upon clearances between tire 33 and oleo components as well as wheel-well door panels, the preferred design will occupy the wheel cavity if available, and/or include a toroidal configuration alongside the tire sidewall and preferably having a maximum radius approximately midway between that of the wheel and that of the tire tread with blades as wide as clearances permit. Various sizes and shapes of impellers are shown with impeller 39 in FIGS. 1-4, impeller 139 in FIG. 8, and impellers 239a and 239c in FIG. 11. While axle-side mounting of the impeller is the preferred location, hub-side mounting is to be regarded as a viable alternative.

Impellers for axle-side mounting preferably shall be made in two halves, such as top half 240a and bottom half 240b shown in FIG. 14, to eliminate the need for removing the wheels from the aircraft in order to accomplish the mounting or replacement. The two halves are joined together by overlapping extensions of their inner rim-like rings, and by mounting holes or lugs on the shell or flat inner tire-side rim to which inner edges of blades are bonded, said lugs or holes being located to permit joining the impeller halves to the wheel shell with appropriate threaded fasteners secured with nylon-insert type locknuts. Configuration and mounting of impellers will vary so greatly from wheel to wheel, and from aircraft to aircraft, that no attempt is made in the accompanying drawings to show all such mountings. Where permissible, use will be made of holes in the wheel shells or discs, and of drilled threaded holes of very small size where existing holes are not available, or where they are absent.

Because of the very gradual acceleration slopes involved in the prerotation system—two minutes or more to go from zero RPM to 1,200 RPM or more—the loading on the impellers and their mounts is quite light. For example, in an 8½" diameter impeller weighing 422 gm. (approximately 15 ounces) made of PVC and acrylic with a mahogany hub ring, mounted on the tubular hub of a 16" tire on a 9" steel wheel, weighing 12 lb., and held in place on the 1½" tubular steel hub portion of the wheel by a single 10-32 setscrew in a brass threaded insert in the mahogany hub collar of the impeller, the unit reached 1,200 RPM in two minutes driven by air at 7,200 feet per minute through a rectangular intake measuring 3"×6" without slipping or failure.

Duct 41 includes an air intake 47 and a rear portion 48 with an air outlet 49 directed onto impeller 39. Duct 41 is mounted where possible to the support or cylinder portion of the oleo assembly which is the principal structural column of the landing gear unit, whether single-wheel, two-wheel pair or quad (four-wheel) unit, with mountings necessarily varying in design specifics for each aircraft. For example, mounting brackets 242 hold duct 241 in place (see FIGS. 9 and 13). The mountings may be hinged to position the duct assembly in the correct operating position with relation to impeller 239a when the aircraft is in flight and the oleo piston is fully extended, i.e., at its lowest possible position and with mountings which include a brace or bracket extending from the lower (axle and oleo piston) portion of the landing gear, to a position on the duct mounting bracket such that as soon as the weight of the aircraft, at landing, begins to move the wheel upward with relation to the fixed portion of the landing gear (cylinder column) the duct will rest on the cushioned tip of said brace or bracket and thereby be lifted upward with the wheel so as not to make contact with the runway.

Each duct serves one impeller, admitting oncoming air through a front facing intake 47, preferably rectangular and of sufficient size to provide the required volume of high-velocity incoming air to drive the wheel/impeller to required RPM in the allotted time.

Figure 9:
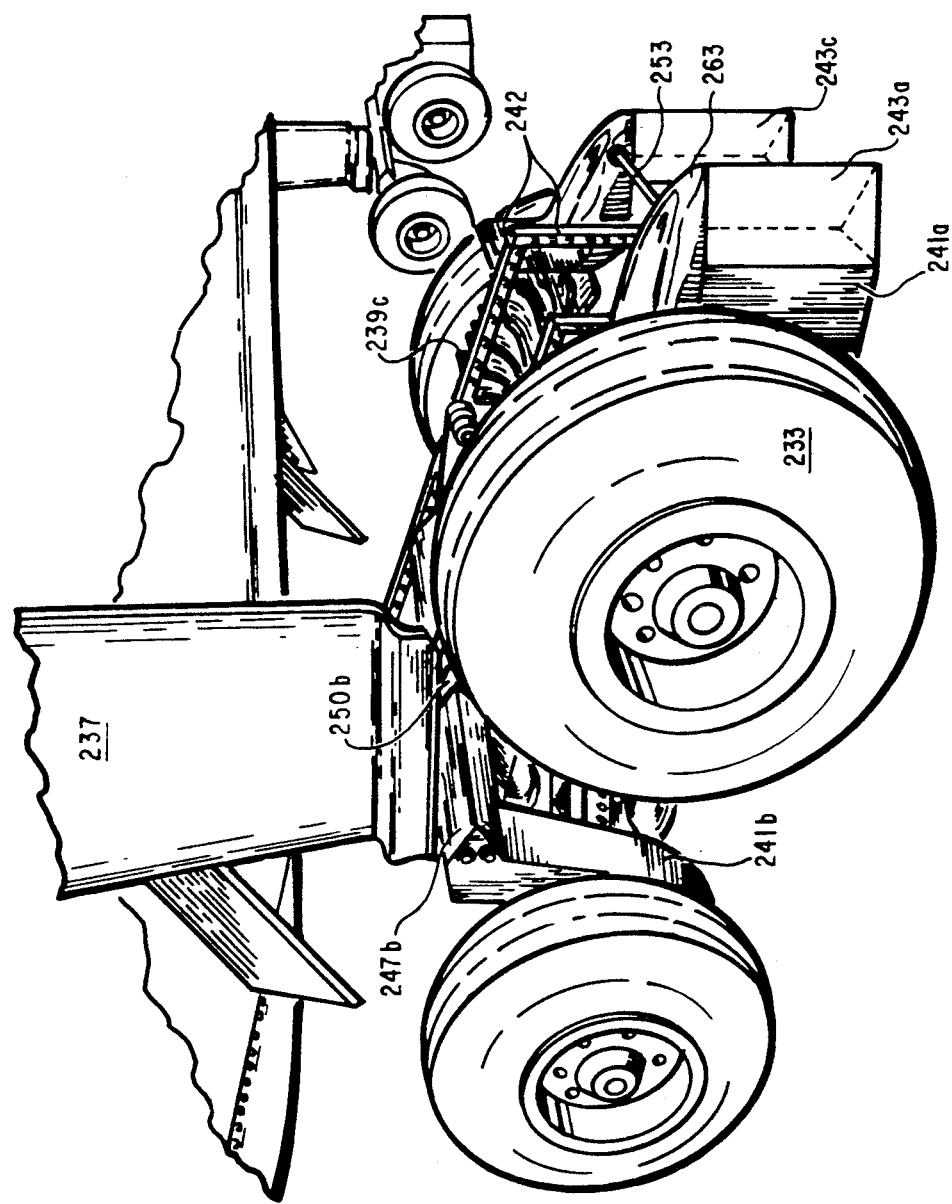
FIG. 9 is a front perspective view of a third embodiment of the present invention on a four-wheel main landing gear assembly of a typical large jet aircraft.
Figure 10:
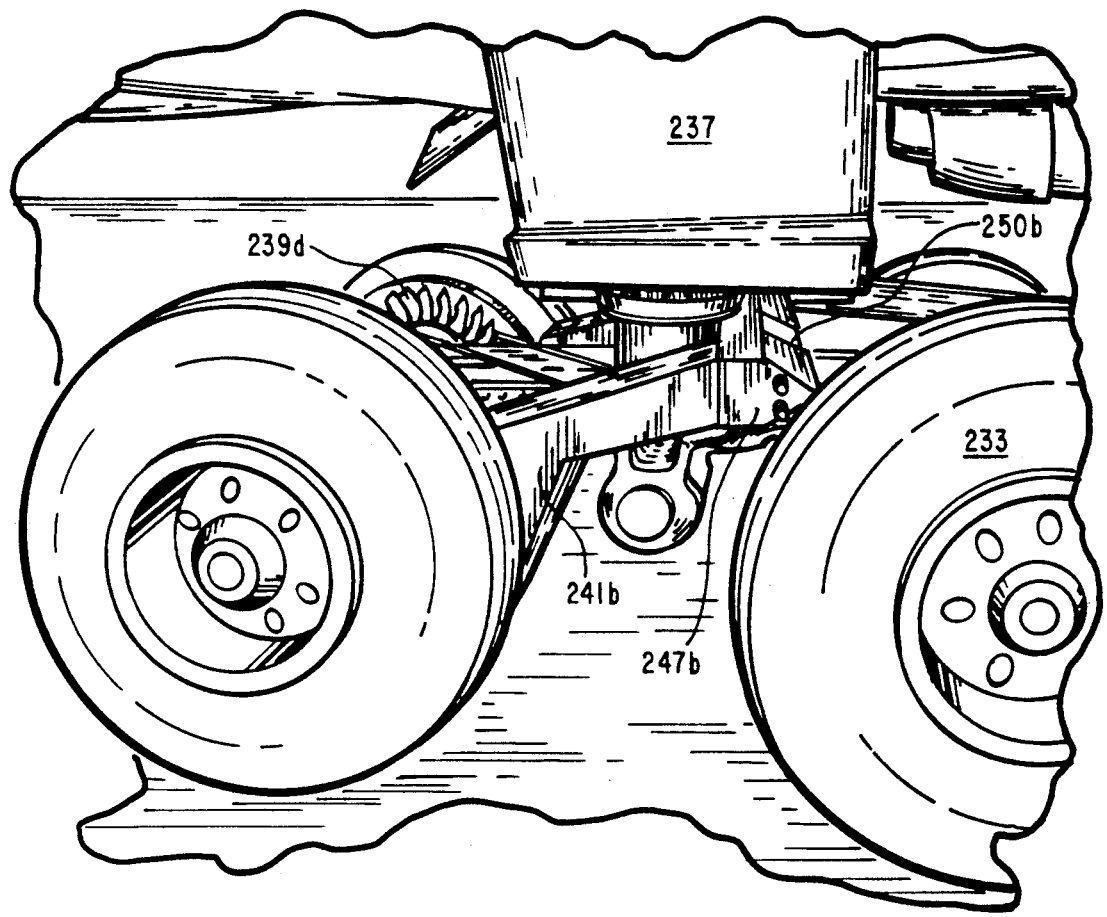
FIG. 10 is a side perspective view of the device of FIG. 9.
Figure 11:
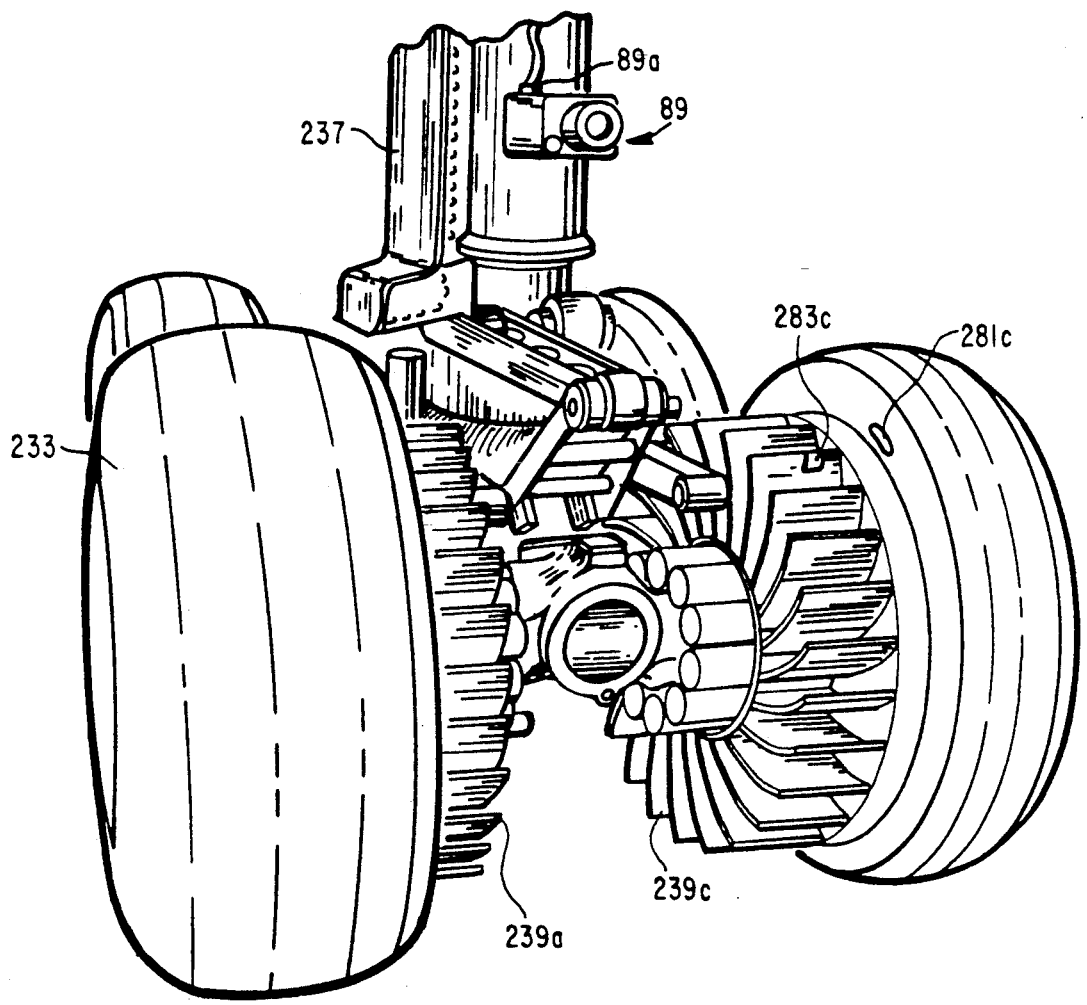
FIG. 11 is a front perspective view of the device of FIG. 9 with the ducts removed for drawing clarity to illustrate the impellers.

Duct configuration preferably has a vertical shape and opening on single wheels and common-axle pairs of wheels. However, for the rear pairs of wheels on a quad unit (see FIGS. 9-12A) a compound duct assembly with two side-by-side horizontal rectangular openings, placed high enough to receive air over the front tires and between them, and conduct it downward against the impellers, shall be a preferred configuration. This is illustrated in FIGS. 9 and 10 with duct 241b and intake duct 247b. The intake 247b is controlled by gate control 250b described more below in configuration with gate control 50.

Flow of high-velocity oncoming air (i.e., 12,000 to 18,000 FPM at approach speeds) reaching the impellers though the intake ducts shall be completely controlled by a gate, such as gate 43 and gate 45, which are in the present embodiments a pair of door-like vanes which, when closed, form a triangular 40° front-facing airfoil-like configuration, and when fully opened lie parallel to incoming air and provide a virtual 100% opening of the rectangular duct 41 in intake 47. A multitude of other gate mechanisms may be used while practicing the present invention.

Figure 4:
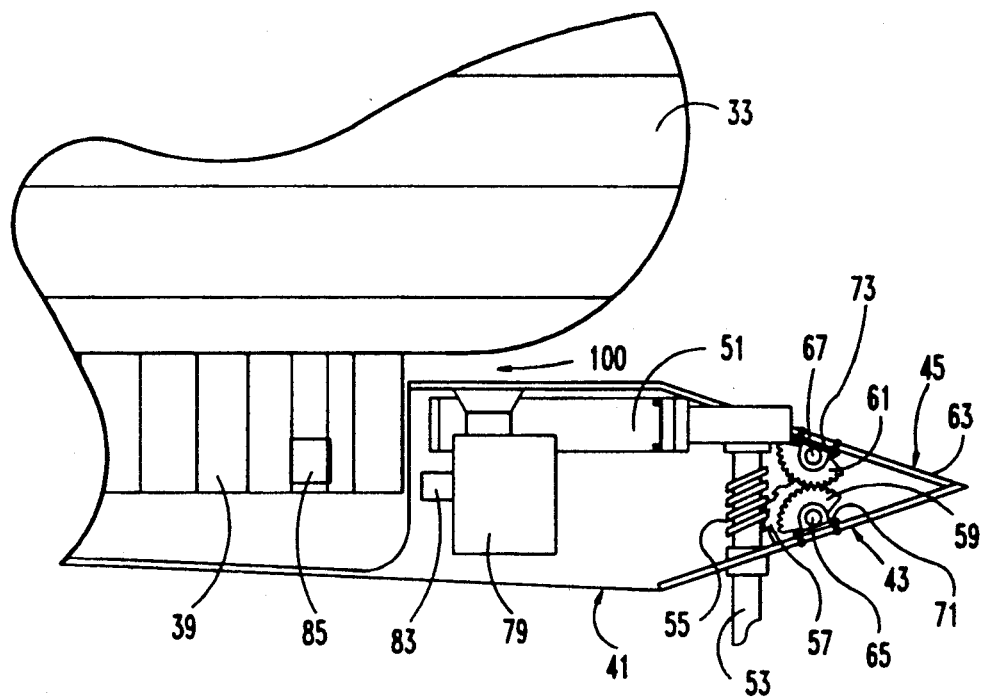
FIG. 4 is a top detail view of the device of FIG. 1 with the intake gates closed.
Figure 5:
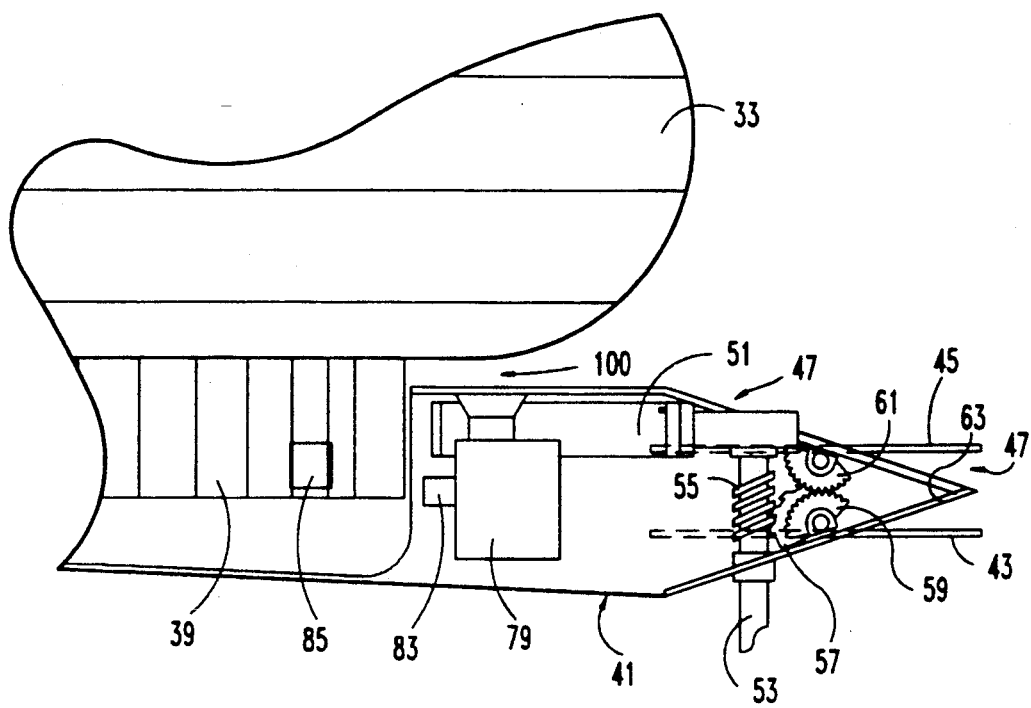
FIG. 5 is a top detail view of the device of FIG. 1 with the gates open.
Figure 6:
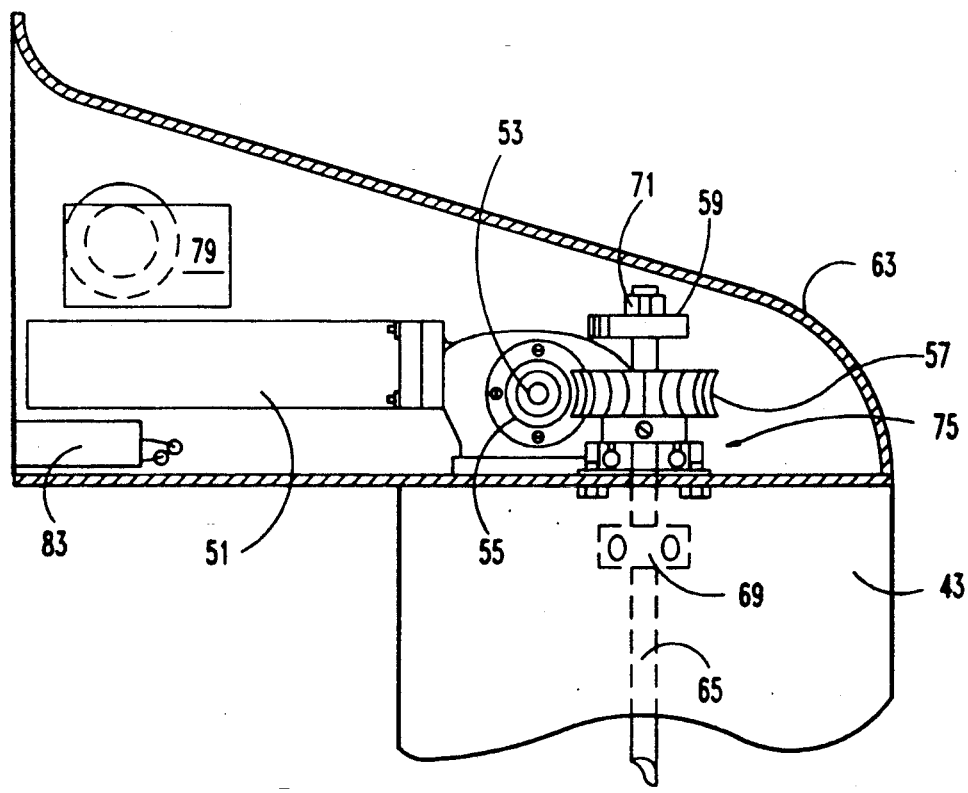
FIG. 6 is a side elevational detail view of the device of FIG. 1.
Figure 7:
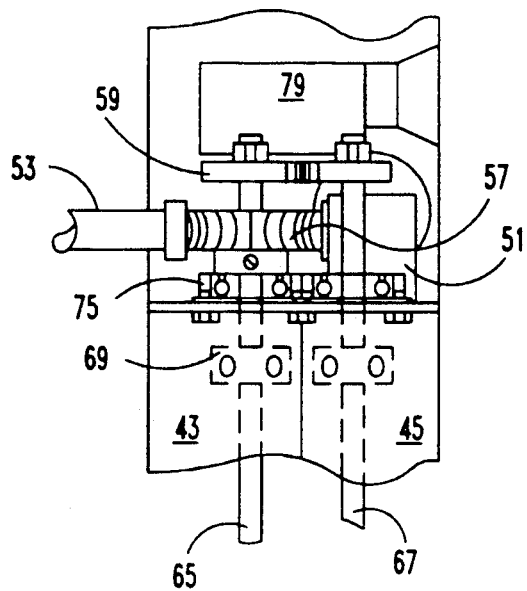
FIG. 7 is a front elevational detail view of the device of FIG. 1.

The door-like intake vanes shall be mounted at the midpoint of their narrow dimension, on a rigid member such as shaft 65 and shaft 67, serving as hinge-pins and drive shafts to control rotation of each vane through a 20° angle from fully open (see FIG. 5) to fully closed (see FIG. 4). Placing the hinge-pin rods at the midpoint will tend to equalize air pressure loading with relation to the shaft, and permit use of a smaller drive motor 51.

Figure 2:
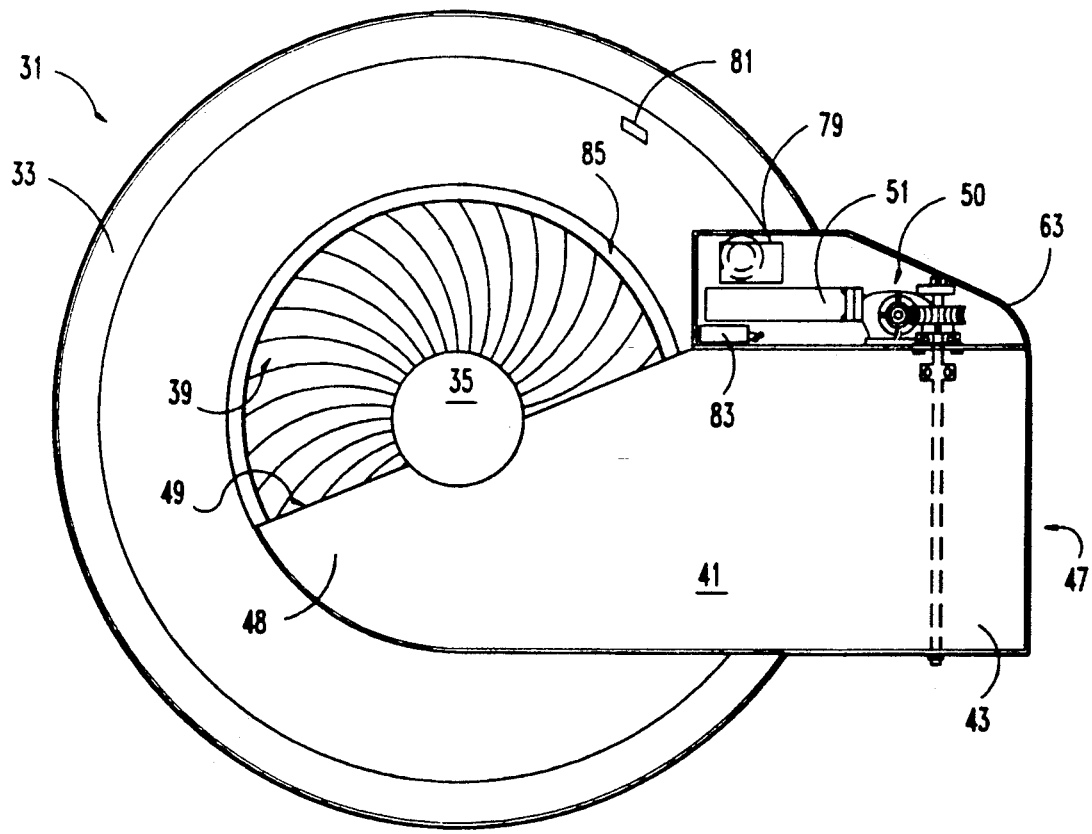
FIG. 2 is a side elevational view of the device of FIG. 1.
Figure 3:
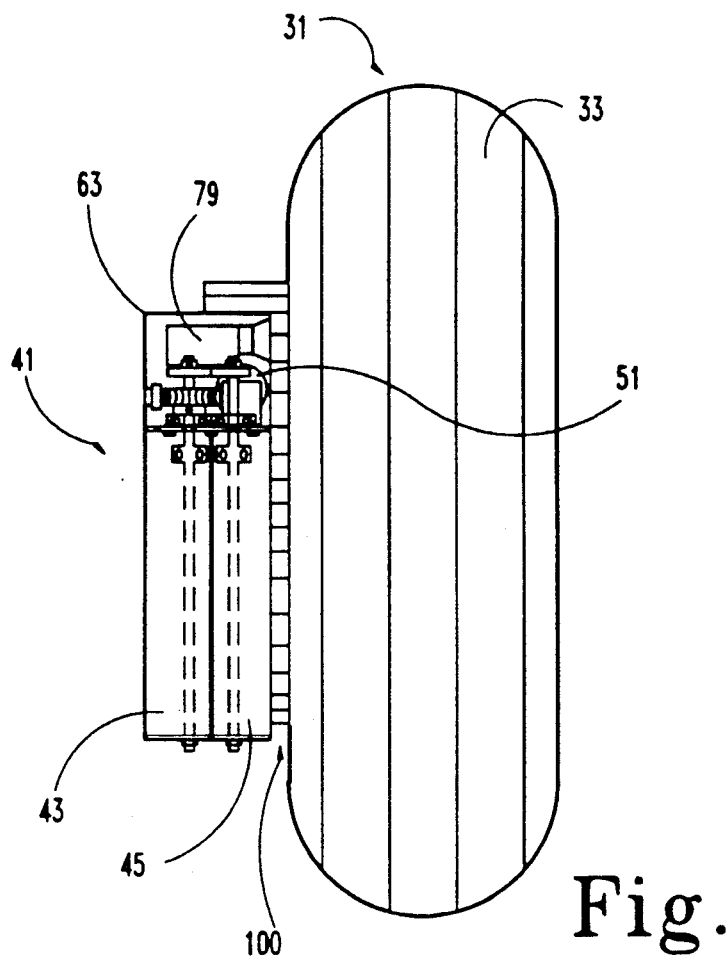
FIG. 3 is a front elevational view of the device of FIG. 1.

Design of duct 41 will be such as to direct air from outlet 49 against the concave surfaces of the impeller blades during their rotation between approximately the 90° point and the 220° point in their rotation, expressed as clockwise rotation as seen on the righthand side of a right-moving aircraft (see FIG. 2, FIG. 8).

In the case of a horizontal duct unit serving a rear-wheel pair (FIGS. 9 and 10), duct design will seek to introduce the airstream at approximately the 60° point and conduct and control it through the 200° point.

Front edges of the door-like intake vanes may be fitted with flexible silicone rubber heaters (not shown) containing embedded resistance wire elements or etched-foil elements, bonded and sandwiched between the outer and inner surfaces of each vane, whose operation would be pilot-initiated when icing conditions warrant.

Similar embedment of heating filaments within the blades of impellers are not necessary owing to the high centrifugal force which would tend to throw all freezing water outward before ice could form on their surfaces. However, such embedded impeller heaters, if used, would use slip-rings to conduct the drive current from the aircraft power source to the revolving impeller blades.

Light weight high-impact plastic materials are suggested for fabrication of the impeller 39, while the same materials or sheet aluminum are suggested for fabricating duct 41, with high-strength aircraft-grade aluminum alloys being used for mounting brackets, frames, clamps, and load-carrying supports.

Several basic design considerations for impellers, and for the intake ducts are preferably used. First, the incoming air should strike the impeller blades as squarely as possible, at a point or area representing the largest radius permitted by the geometry and clearances of the installation; secondly, the air stream, having done its work on the wheel through a significant portion of the rotation cycle—i.e., approximately 120° to 160° of travel—the air should be free to move out of the impeller and go its way. Thus, as illustrated both in FIG. 2 and in FIG. 8, duct 41 (and duct 141, respectively) covers a number of impeller blades along the bottom of impeller 41 or impeller 141 which is less than one half of the total number of impeller blades, with the remainder of blades being exposed to allow free outflow of air discharged from outlet 49 or outlet 149.

For this reason, an optimum design for impellers, such as impeller 41, has been found to involve mounting the blades' inner ends or edges on a pair of narrow rings so that the bottom or inner end of each cavity or space between adjacent blades shall be open and permit working air to escape inward through the impeller into the hub area and away from the blades, quickly providing for the unimpeded entry of more air. In the case of large toroidal impellers such as those shown in FIGS. 8, 10 and 11, which encircle the cluster of hydraulic brake pistons and cylinders occupying most of the inner wheel cavity, this open design of impeller blades permits air to flow inward through the impeller and onto these hydraulic brake components for cooling. During take-off, the intake ducts would remain fully closed for minimization of drag, but during landing, deceleration and taxiing they would remain fully open to maximize air flow to the brakes.

Design of duct 41 dictates the general principle that the ducting should conduct a sufficiently large stream of high-velocity air onto the impeller at the most favorable angle and during the most favorable portion of its angular travel, guiding it enough to maximize this effect, and otherwise not confining or restricting its flow or egress. The duct assembly must not physically touch the impeller or the wheel, but instead is independent therefrom and in close proximity thereto with only a narrow gap 100 separating the duct assembly from the wheel and impeller (see FIGS. 3-5).

Conversely, weight and aerodynamic considerations call for the smallest possible prerotation assembly. Design and manufacturing procedures which would include full size high-velocity air and wind-tunnel testing of components on landing gear and wheel assemblies under simulation of all possible in-flight conditions, making full use of CAD (computer-assisted design) techniques, finite element analysis, loading and stress analysis, are to be used for a given design to optimize design and to assure maximum fulfillment of all needs and requirements as to strength of materials and assemblies, components and mountings, as well as functionality under flight conditions.

B. ELECTROMECHANICAL

An electric motor 51, preferably a brushless DC motor, a DC servomotor, or a PM stepping motor made for operation in true closed-loop servo mode, is used in conjunction with an integral worm 55 and worm gear 57 reduction unit and right-angle output shaft 53 (except for use with the horizontal side-by-side intake duct configuration on the rear wheels of quad landing gear units). The gearing described and depicted in FIGS. 1-8 and particularly in FIGS. 4-7 in larger detail, drives and controls the opening and closing and positioning of the door-like intake vanes, gate 43 and gate 45.

These motors, of which there will be one for each impeller, or one for each pair of impellers serving a pair of side-by-side wheels mounted on a common axle 253 (see FIG. 9), will operate in true closed-loop servo mode, receiving signals of appropriate amplitude and polarity to power the required motor rotation both for moving the load (vanes 43, 45) and for holding the load (vanes 43, 45) in the correct position pending the arrival of subsequent "error signals" from a motor controller 93 (see FIG. 15) calling for a new correction of position.

A gearmotor 51 with a no-load speed of 180 rpm on the output shaft 53, working into a 30:1 reduction accomplished by the single-thread worm 55 and 30-tooth worm gear 57 which is mounted on the vane hinge shaft 65, will rotate the vane 43 the full 20° of its travel, from fully closed to fully open or vice versa, in 0.555 sec. This assembly is held by mount 75. A larger worm gear would move it more slowly and with greater angular sensitivity, whereas a two-thread worm would double the operating speeds associated with particular worm gears. Rotation of motor 51, shaft 53 and worm 55 cause worm gear 57 to rotate. Gear 57 is attached to shaft 65 which is attached to gate 43 by securement 69 to open and close gate 43 upon rotation of shaft 65. Shaft 65 is also attached to spur gear sector 59 which in turn engages a second gear sector 61. Gear 61 rotates shaft 67 which is attached to and pivots to open and close gate 45. Shafts 65 and 67 are mounted to duct 41 for pivoting by pivot mounts 71 and 73, respectively.

For this duty, full enclosure of the gearing in an oil-tight cast gearbox is regarded as probably unnecessary in view of the protective effect of hood 63 (shown partially cut away) enclosing all gearing, motor and photo-tachometer, while also leaving the gearing more accessible for inspection, adjustment, lubrication and replacement. These gears 57, 59 and 61 will, of course, typically only be segments of gears instead of full 360° gears, having only the number of teeth required for angular movement as designed, such as 20°, plus a margin for safety by reason of their operating within the angular confinement of duct 41 and hood 63 having approximately the same angular configuration as that of the closed vanes.

FIG. 8 illustrates a second embodiment of the present invention with duct 141 and tire 133. Impeller 139 is driven by air from outlet 149 for rotation about hub 135. Tire 133 has light reflective attachment 181 for use in conjunction with photo-tachometer 179. Furthermore, light reflective attachment 185 is mounted on impeller 139 for use in conjunction with photo-tachometer 183. Duct assembly 141 includes gates 143 and hood 163. Note that hood 163 has a vertical protrusion in front of the upper half of impeller 139. Motor 151 is provided to drive worm 155 which turns gear 157. Gear 157 is shafted to open and close gate 143 and is shafted to gear sector 159 similar to the first embodiment described above for opening an associated second gate (not shown) to control the airflow through duct 141.

Motor driving a side-by-side pair of intake vanes will do so by means of an extension of the worm gear shaft 253 from one intake hood 263 to the other, where it will drive an identical worm gear by an identical worm mounted directly on that drive shaft (see FIG. 9). During most of its length, this shaft may be larger and tubular in form for greater radial stiffness and lighter weight. Because of its small size, shrouding with an airfoil cover is regarded as not necessary.

Motor driving a side-by-side pair of horizontal intake doors or vanes, such as vane 243a on duct 241a, or such as vane 243c, does not require the right-angle output shaft because the worm gear would lie in a vertical plane and only one complete set of gearing would be required to drive both vane hinge shafts, which would be horizontal and extend the full width of the unit. Also, the present invention may utilize a variety of drive mechanisms, including hydraulics, or other motor arrangements to open and close the intake gates.

C. SENSORS

A true Doppler radar transmitter and receiver unit 89 housed in a shock-proof enclosure and mounted on the front side of the main vertical structural support 237 (generally the oleo cylinder) is used to measure true ground speed. Radar 89 is coupled to the rest of the system by a connector 89a such as an RS-232 connector and cable.

Radar 89 will commence operating at landing-gear deployment and continue to operate until all wheels are on the runway. It will provide continuous actual ground speed of the aircraft during the entire approach cycle, with effective operating range of approximately 180 MPH and 2,000 ft. and a useful resolution (accuracy) of one mile per hour. Its output signal, in the form of a binary pulse train, will be transmitted to the system's on-board microcontroller 87, hereafter described. Only one radar transmitter/receiver is required for each aircraft.

At least two firms are known to manufacture a radar unit 89 which may be made adaptable for use by the prerotation system with only minor changes in circuitry to provide a binary pulse train for the microcontroller instead of its present BCD and LCD readout circuitry, and a weatherproof shockproof housing for outside mounting on the aircraft. Operating ranges, sensitivity or resolution, and sampling rates are adequate for the prerotation system, and will provide a ground speed reading much superior to airspeed measurements sometimes relied upon in approach and landing, these being subject to crosswinds and head- or tail-winds unless compensated for by elaborate computerized components or peripherals. Although the above system for determining ground speed is preferred, other mechanisms for determining true ground speed may be utilized such as a Doppler shift in light frequency device or from true ground speed data being determined on the ground and transmitted to the aircraft.

At least one, and preferably two "non-contact" sensors (i.e. not touching wheel 31 or impeller 39) are provided. Non-contact photoreflective sensor 79 with integral tachometer is mounted adjacent wheel 31 and one is required for each aircraft landing wheel or side-by-side common-axle pair of wheels. Each tachometer 79 senses the precise instantaneous RPM of its wheel or couple wheel pair by sensing the movement of light reflector 81 on wheel 31, and transmitting this data at the required sampling frequency rate in the form of a binary pulse train to the microcontroller 87, hereinafter described.

Photoreflective opto-electrical switch 83 consisting of an infrared LED and a photodarlington transistor, preferably in a common housing and mounted at an angle of approximately 40° such as to scan a reflective band 85 or small area, whose electrical output goes directly to the microcontroller 87 as a square wave pulse train, for counting and arithmetic conversion. Light-weight durable reflective band 85 securely mounted on the outer edges of two adjacent blades of the impeller 39, is positioned to lie in the path of the opto 83. Output from opto 83 goes to an OR gate together with the output of photo tachometer 79 described above, thus providing a redundant tachometer sensor such that the failure of one or the other tach sensors would not result in loss of RPM data, while loss of both outputs would strongly indicate a frozen wheel bearing or locked brake and a very low count from both tach sensors might indicate extra friction or damping somewhere in the wheel-brake axle assembly. Other non-contact tachometers may be used such as a ferro magnetic imbedment with a ferro magnetic proximity sensing tachometer.

The embodiment of FIGS. 9-14 similarly use photo-tachometers (or non-contact proximity sensing tachometers) along with actuators such as light reflective attachments 281a, 281c, 283b and 283c as illustrated.

On aircraft presently using the initial rotation of the landing wheels, through use of an in-hub DC generator, to activate the anti-locking brakes, a slight change in circuitry may be used when the present prerotation system is installed, because wheel rotation will begin as soon as the landing gear are deployed and in position.

An LVDT (linear variable displacement transducer) 76 (see FIGS. 12A and 12B) is mounted on the rear side of the support 237 (principle vertical column) of the landing gear, with its moving element 77 extending downward and fastened to a point on the axle housing or just below the lower limit of the piston-column end of the oleo. Energized by the DC current from a conventional in-hub DC generator, the LVDT 76 will immediately sense the beginning of upward movement of the wheel 231 at the moment that the tire 233 touches the runway and the weight of the slowing aircraft begins to settle upon the landing gear. The several inches of upward movement of wheel/axle can be sensed precisely and in linear manner, transmitting this movement as a voltage change to the present anti-lock brake control circuitry to generate a brake enable signal transmitted through connector and cable 76a. The LVDT output is such as to permit accurate calibration of its linear travel in thousands of pounds of aircraft weight, with the switching threshold for brake enable located at any desired point so that a predetermined small percentage of total load, sufficient to assure good tire contact for effective and safe braking, may be used instead of the first skimming contact.

In addition, the LVDT sensor will respond to bounces which sometimes occur in rough landings, disabling the brakes again as soon as runway contact is lost, and restoring them after the bounce. It appears that the present system of using rotation alone cannot do this because once the wheels are spinning, a bounce could not be detected without additional sensors, and the second contact (after the bounce) would be made with locked brakes.

A 420,000 lb. plane with eight main landing wheels (disregarding the nose wheels for this analysis) will place 52,500 pounds or about 26 tons of weight on each of the eight tires when the craft reaches taxiing speed. The LVDT sensors could be set to generate brake enable at approximately one ton or more to assure good tire contact for braking.

The LVDT position sensors will provide calibrated wheel loading data to the anti-locking braking system of the aircraft which cannot be gained solely from the present in-hub DC generators, which verify only wheel rotation. In addition, they are able to sense bounces in rough landings and disable the brakes until after the bounce. Providing signals which will be ANDed by the braking system, they will assure that both main landing gear are firmly in ground contact before brakes are enabled, to avoid the spin and control loss which could occur if brakes are applied on one side before the wheels on the other side are in firm runway contact.

The LVDTs, generally three in number per aircraft—one for each landing gear assembly including nosewheel—will be wired into the aircraft's existing antilock braking control circuitry, not into the prerotation system.

D. INSTRUMENTATION

Figure 15:
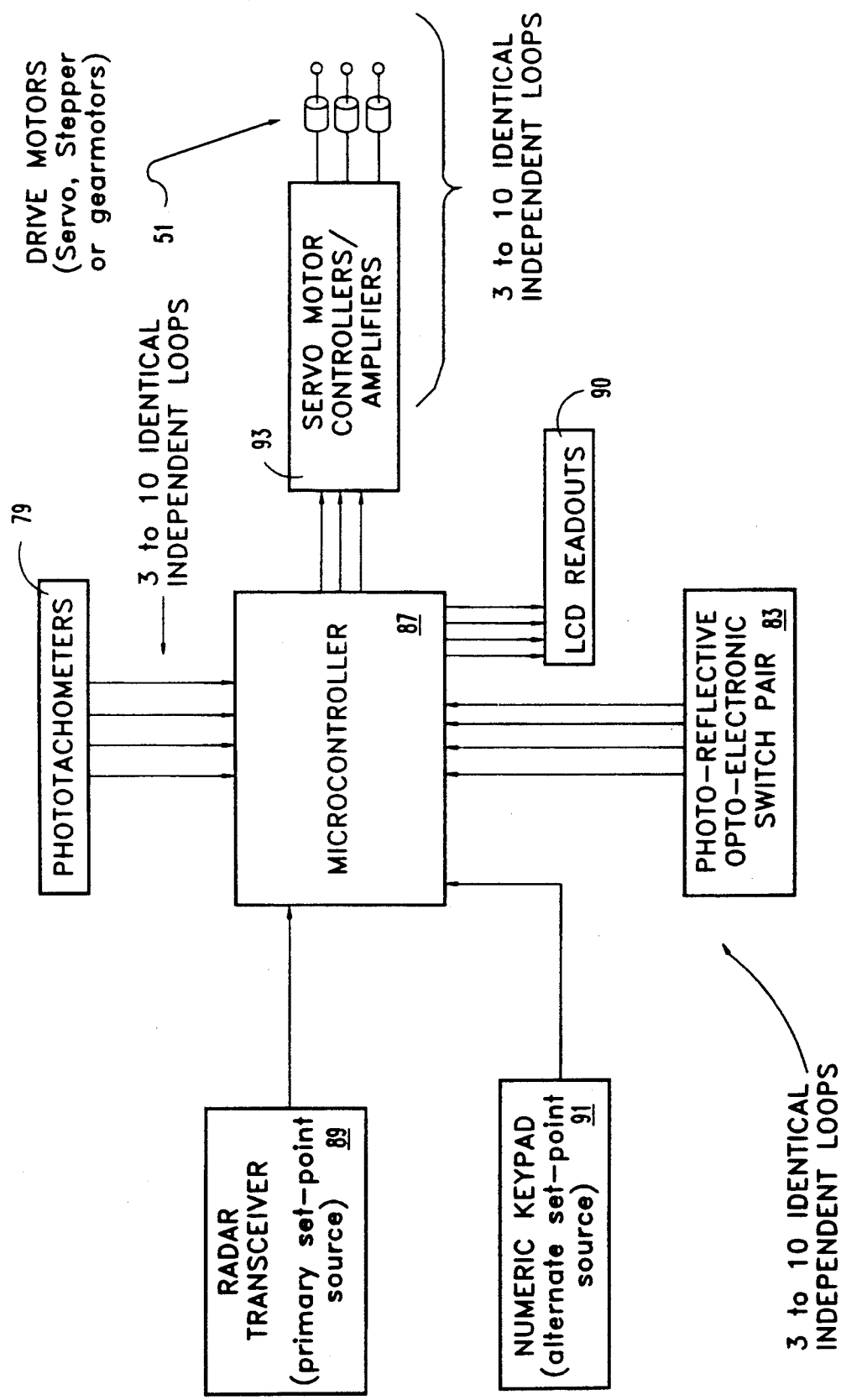
FIG. 15 is a schematic block diagram of the control system of the present invention.
Figure 16:
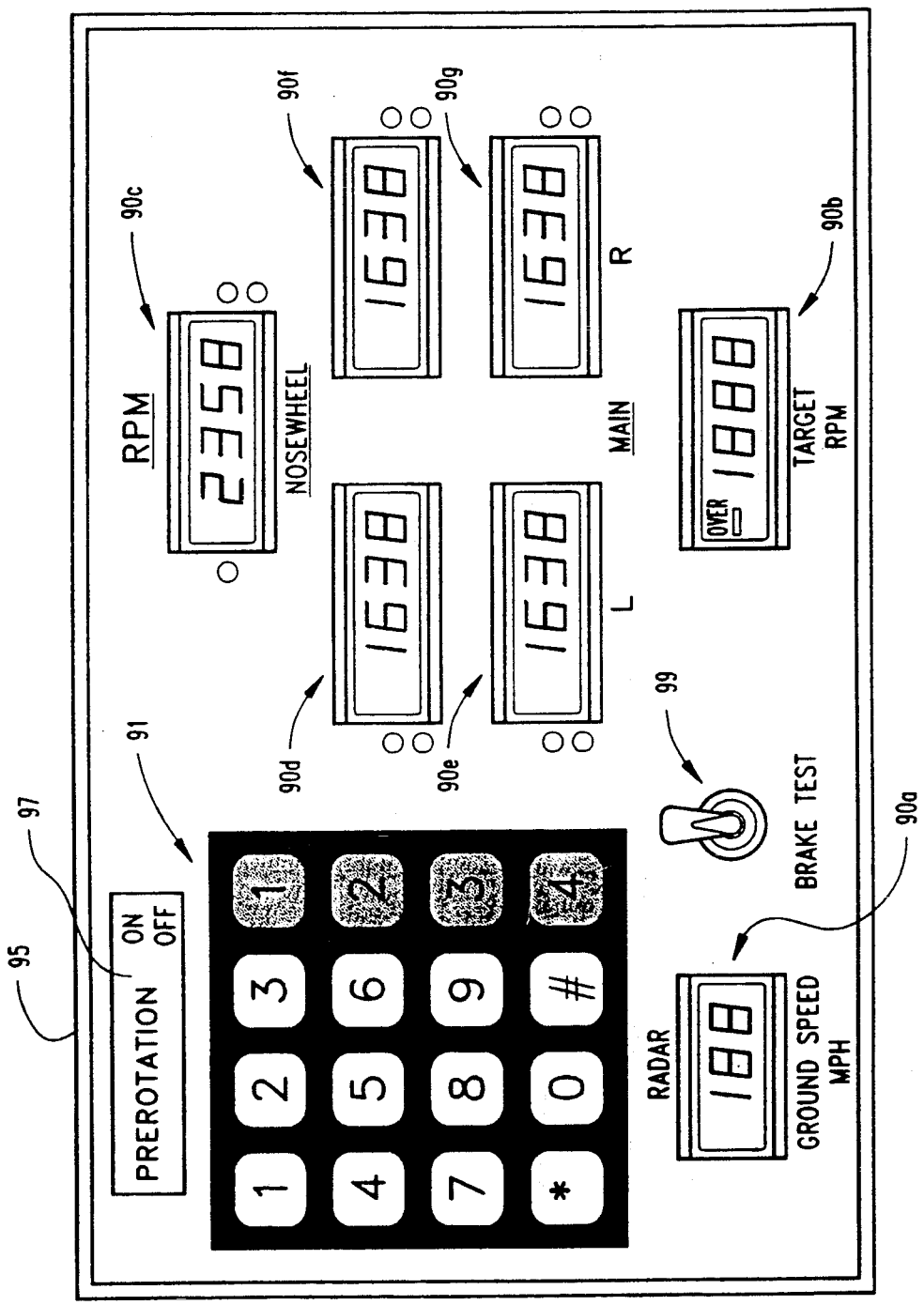
FIG. 16 is a plan view of a control panel of the present invention utilized in the control system of FIG. 15.

Referring particularly to FIGS. 15 and 16, microcontroller 87 and associated peripheral logic elements, to perform the following functions and having the necessary inputs and outputs (typically 3 to 10 identical independent loops) to do so are shown. Control panel 95 is also shown, being located in the cockpit.

Microcontroller 87 receives output signals from all non-contact tachometers 79 at an appropriate sampling rate controlled by its clock(s), multiplexed to its APU (arithmetic processing unit). Microcontroller 87 translates each of these inputs into one of two RPM figures, one for the main wheels (see readouts 90d, 90e, 90f and 90g) and another for the nose wheels (see readout 90c) by applying the appropriate arithmetic operations based upon predetermined ratios derived from the aircraft's tire circumferences.

Microcontroller 87 receives the output of the front-directed Doppler radar 89 and, through appropriate arithmetic operations, translates it, at the appropriate sampling rate, from miles-per-hour displayed by digital readout 90a to two target RPM rates—one for the main wheels (see readout 90b) and one for the nose wheels (not shown) based upon predetermined ratios derived from the aircraft's tire circumferences.

Microcontroller 87 sequentially passes all of these inputs through a comparator and derives for each tachometer input an error signal whose polarity and amplitude will be used, after appropriate amplification, to drive the servo motor 51 or DC motor operating in true closed-loop servo mode—whose operation controls the specific intake 47 physically associated with that particular wheel 31 and tachometer input.

It is at this point that the closed-loop servo's loop is closed, so that it is underspeed or overspeed rotation of a given wheel which, when compared to the radar's target RPM at that instant, provides the error signal whose polarity and amplitude drive the servo motor to open or close, in small increments, the pair of intake door-like vanes 43 and 45 which control the flow of incoming air reaching the impeller 39 on that particular wheel.

Impellers on a weighted 16" diameter wheel operated by ducted air moving at a rate of 6,000 FPM indicate that this system, as designed, will have a sufficiently short time constant and sensitivity to make rapid and adequate corrections to air inflow rates necessary for achieving and maintaining the RPMs dictated by the radar throughout the "window of time", assuring high-precision close-tolerance synchronism with the runway at the unpredictable moment of touchdown.

In integrating the various logic elements into the overall system, it is required that all multiplexed inputs and outputs have both irrevocable identity and associative relationships so that it will be impossible for an output to go to the wrong servo control loop, through blips, dropped pulses, glitches or shift-register-like misfunction. All discrete tachometer inputs and all discrete servo motor driver outputs should be the equivalent of hard-wired, with only a sequence of enabling signals being distributed by multiplexing, to safeguard the integrity of each independent control loop.

At this time, several families of technically advanced, versatile, highly reliable and moderately priced microcontrollers are on the market which would readily handle most, if not all, control functions of microcontroller 87 used by the prerotation system. These include Motorola's MC68HC family and National Semiconductor's COP 800 and HPC families, to name only a few. Such MCU families also have completely compatible peripheral logic devices where the many capabilities of the basic MCU must be augmented, including optocouplers, optoisolators, line drivers and op-amps, capable of interfacing with stepping motor and servo motor drivers and controllers, such as controller (amplifier 93 in FIG. 15) directly, while also providing needed outputs for the LED readouts 90 on control panel 95. Industrial grade units in these families appear to have both the operating temperature ranges and the durability which the present prerotation system requires, as it is only operational at near-sea level and is passive at high altitudes. MIL SPEC components could of course, be specified instead, where the application or environment indicates the need. All of these units have a sufficient number of I/O for this application, along with all of the memory, arithmetic and other input data management capabilities to dependably handle the requirements of this system as the central control unit or "black box".

A numeric keypad 91 is located in the pilot's compartment. Normally preset at installation of the system, its first purpose is to provide a high-limit RPM to the microcontroller 87 until such time as the radar 89 output has reached that limit in its decreasing signal during the approach and gradual slowing of the aircraft. Purpose is to spare the prerotation systems from needless gross overspeed which would otherwise result from early deployment of the landing gear while aircraft speed is still much higher than expected landing speed.

A second function of this keypad 91 is to provide programmed target RPM for both main wheels and nose wheel in installations in small aircraft where the sensitivity of radar control and input is deemed unnecessary and therefore not used. In this mode of operation, the pilot could make small fine-tuning adjustments to his target landing speed (and equivalent RPMs) during approach, if desired.

LCD indicators or readouts 90a-90g are provided. These readings, generated by the microcontroller 87, are panel-mounted in panel 95 as a logically arranged group in the pilot's compartment, and provide continuous readouts of wheel RPMs and of actual ground speed 90a from the radar 89. Panel 95 also includes a system on/off indicator/control 97 and a brake test switch 99 for testing brakes against the RPM readouts prior to touch down.

In-flight brake testing may be a significant safety feature of the prerotation system. A brief pre-landing test could readily be carried out as soon as the landing gear is lowered and rotation of the wheels has begun, by providing a brake enable switch to permit brief application of the aircraft brakes very early in approach. Gradual application of brakes should reflect a gradual and uniform speed drop on all wheels, readily observed on the numeric keypad with its LCD readouts of each wheel or wheel pair, arranged to correspond with the geography of the landing wheels themselves. Such a test would, by actually slowing the wheels, visibly indicate the integrity of the entire braking system.

Provision for similar in-flight testing any time during flight could be managed by providing small vents which could be opened on command to admit low-volume air flow into the prerotation system air intake ducts while the wheels are in the wheel wells (not shown), sufficient to generate about 100 RPM. Done early in the flight, such a test could indicate some conditions which might warrant radio communications to destination control in order to arrange for possible landing problems.

The instrumentation of the present prerotation system will provide valuable information to the pilot and crew by use of panels of LCD readouts which give continuing RPM readings for each wheel—including the important nose wheel(s). It will therefore indicate any low RPM or zero RPM which might indicate a frozen wheel bearing or a locked brake; it will also permit the pilot, under such circumstances, to override the system and disable one air intake on the opposite side of the aircraft to preserve symmetry during landing. It will also, through its forward-directed true Doppler radar, indicate actual ground speed—with greater accuracy than can be achieved with pitot tube or other airspeed measuring sensors.

The stabilizing ability of the gyroscopic effect inherent in heavy flywheel-like rotating masses is well known. Prerotation of aircraft tires, as set forth in this invention, will provide a significant beneficial gyroscopic stabilizing effect upon the aircraft during approach and landing, diminishing the effect of crosswinds.

In aircraft in which the landing wheels are folded upward into a horizontal position, there is inherent in this prerotation system a means of providing gyroscopic stability while in turbulent weather, simply by providing the means for oncoming air to be admitted into the wheel wells in alignment with the prerotation duct air intakes and inducing high RPM wheel rotation, which would contribute to damping the effect of air pockets and low pressure regions which occasionally cause a large aircraft to suddenly drop several thousand feet at dangerously high-speeds.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A system for prerotating an aircraft's landing gear wheel prior to landing wherein the aircraft has at least one landing gear wheel attached to the aircraft by a support, comprising:
    means for measuring the true ground speed of the aircraft independently from the aircraft's airspeed;
    means for rotating said wheel at selective revolutional speeds while the aircraft is airborn;
    means for measuring said revolutional speeds of said wheel; and
    control means for operating said means for rotating said wheel, said control means being responsive to said means for measuring the true ground speed and responsive to said means for measuring said revolutional speeds of said wheel, wherein said control means operates said means for rotating to selectively increased and decreased revolutional speeds of said wheel to correspond to the true ground speed, wherein said wheel has an impeller attached thereto, and wherein said means for rotating said wheel comprises a duct having a forward air intake and an air outlet, said outlet being directed towards said impeller to rotate said wheel, said duct having a variable gate therein to regulate airflow through said duct onto said impeller, said gate being openable by power means responsive to said control means, wherein said airflow through said duct and the rotational speed of said wheel is proportionally increased and decreased by respective opening and closing of said variable gate in response to said control means in relation to the true groud speed of the aircraft.

2. The system of claim 1 wherein said means for measuring said revolutional speeds of said wheel comprises a photoreflector on said wheel and a non-contact photosensor mounted apart from said wheel to generate an r.p.m. signal.

3. The system of claim 9 wherein said means for measuring said revolutional speeds of said wheel comprises a photoreflector on said wheel and a non-contact photosensor mounted apart from said wheel to generate an r.p.m. signal.

4. The system of claim 3 wherein said control means comprises a microprocessor operable to read ground speed signals from said means for measuring the true ground speed and r.p.m. signals from said means for measuring revolutional speeds, and wherein said microprocessor is programmed to send a control signal to said means for rotating said wheel responsive to said r.p.m. signal and to said ground speed signal.

5. The system of claim 4 wherein said support shortens under weight of landing the aircraft, and further comprising means for enabling the engaging and disengaging of a wheel brake connected to said support, wherein said wheel brake is engagable when said support is shortened under said weight, and wherein said wheel brake is not engagable when said support is not shortened by said weight.

6. The system of claim 5 wherein said variable gate comprises a pair of oppositely disposed hinged doors at said air intake and wherein said power means comprises an electric motor coupled to move gear means, said pair of doors being coupled to said gear means for opening and closing said pair of doors.

7. The system of claim 6 wherein said means for measuring rotational speed of said wheel is coupled to a tachometer readout in the aircraft wherein the pilot may verify wheel rotation.

8. The system of claim 6 and further comprising a readout display for the aircraft pilot coupled to said control means having readouts for true ground speed readout, a target wheel r.p.m. readout as a function of said true ground speed, and a tachometer readout for actual wheel r.p.m.

9. A system for prerotating an aircraft's landing gear wheel prior to landing, comprising:
    at least one landing gear wheel attached to the aircraft by a support;
    means for measuring the true ground speed of the aircraft independently from the aircraft's airspeed;
    means for rotating said wheel at selective revolutional speeds while the aircraft is airborn;
    means for measuring said revolutional speeds of said wheel;
    control means for operating said means for rotating said wheel, said control means being responsive to said means for measuring the true ground speed and responsive to said means for measuring said revolutional speeds of said wheel, wherein said control means operates said means for rotating to selectively increased and decreased revolutional speeds of said wheel to correspond to the true ground speed, wherein said wheel has an impeller attached thereto, and wherein said means for rotating said wheel comprises a duct having a forward air intake and an air outlet, said outlet being directed towards said impeller to rotate said wheel, said duct having a variable gate therein to regulate airflow through said duct onto said impeller, said gate being openable by power means responsive to said control means, wherein said airflow through said duct and the rotational speed of said wheel is increased by increased opening of said gate;

wherein said means for measuring the true ground speed comprises a Doppler radar unit on the aircraft.

10. The system of claim 1 wherein said control means comprises a microprocessor operable to read ground speed signals from said means for measuring the true ground speed and r.p.m. signals from said means for measuring revolutional speeds, and wherein said microprocessor is programmed to send a control signal to said means for rotating said wheel responsive to said r.p.m. signal and to said ground speed signal.

11. The system of claim 1 wherein said support shortens under weight of landing the aircraft, and further comprising means for enabling the engaging and disengaging of a wheel brake connected to said support, wherein said wheel brake is engagable when said support is shortened under said weight, and wherein said wheel brake is not engagable when said support is not shortened by said weight.

12. The system of claim 11 wherein said variable gate comprises a pair of oppositely disposed hinged doors at said air intake and wherein said power means comprises an electric motor coupled to move gear means, said pair of doors being coupled to said gear means for opening and closing said pair of doors.

13. The system of claim 12 and further comprising a second, auxiliary means for measuring wheel revolutional speed for providing an independent, second r.p.m. signal.

14. The system of claim 1 wherein said means for measuring rotational speed of said wheel is coupled to a tachometer readout in the aircraft wherein the pilot may verify wheel rotation.

15. The system of claim 1 and further comprising a readout display for the aircraft pilot coupled to said control means having readouts for true ground speed readout, a target wheel r.p.m. readout as a function of said true ground speed, and a tachometer readout for actual wheel r.p.m.

16. A system for prerotating an aircraft's landing gear wheel prior to landing wherein the aircraft has at least one landing gear wheel attached to the aircraft by a support, comprising:

means for rotating said wheel at selective revolutional speeds while the aircraft is airborn, wherein said wheel has an impeller attached thereto, and wherein said means for rotating said wheel comprises a duct having a forward air intake and an air outlet, said outlet being directed towards said impeller to rotate said wheel, said duct having a variable gate therein to regulate airflow through said duct onto said impeller, said gate being openable by power means responsive to control means for operating said means for rotating said wheel, wherein said airflow through said duct and the rotational speed of said wheel is increased by increased opening of said variable gate to selectively increase and decrease revolutional speeds of said wheel, wherein said variable gate comprises a pair of oppositely disposed hinged doors at said air intake and wherein said power means comprises an electric motor coupled to move gear means, said pair of doors being coupled to said gear means for opening and closing said pair of doors.

17. The system of claim 16 wherein said support shortens under weight of landing the aircraft, and further comprising means for enabling the engaging and disengaging of a wheel brake connected to said support, wherein said wheel brake is engageable when said support is shortened under said weight, and wherein said wheel brake is not engageable when said support is not shortened by said weight.

18. The system of claim 16 and further comprising means for measuring said revolutional speeds of said wheel comprising a light reflector on said wheel and a photo-receptive device to generate an r.p.m. signal based on light reflected from said reflector, said control means responsive to said r.p.m. signal.

19. A system for prerotating an aircraft's landing gear wheel prior to landing, comprising:

at least one landing gear wheel attached to the aircraft by a support;

means for rotating said wheel at selective revolutional speeds while the aircraft is airborn, wherein said wheel has an impeller attached thereto, and wherein said means for rotating said wheel comprises a duct having a forward air intake and an air outlet, said outlet being directed towards said impeller to rotate said wheel, said duct having a variable gate therein to regulate airflow through said duct onto said impeller, said gate being openable by power means responsive to control means for operating said means for rotating said wheel, wherein said airflow through said duct and the rotational speed of said wheel is increased by increased opening of said variable gate to selectively increase and decrease revolutional speeds of said wheel, wherein said variable gate comprises a pair of oppositely disposed hinged doors at said air intake and wherein said power means comprises an electric motor coupled to move gear means, said pair of doors being coupled to said gear means for opening and closing said pair of doors; and means for measuring the true ground speed comprising a Doppler radar unit in the aircraft to generate ground speed signals, said control means responsive to said ground speed signals.

20. The system of claim 16 wherein said gear means comprise a worm gear shafted to said motor and a second gear engaging said worm gear, wherein said second gear is coupled to a first sector gear secured to a first of said hinged doors, said first sector gear engaging a second sector gear secured to a second of said hinged doors, wherein rotation of said worm gear causes said first and second sector gears to move said pair of hinged doors.

21. The system of claim 16 wherein said air outlet of said duct covers a number of blades of said impeller which is less than one half of the total number of blades of said impeller, with the remainder of said total blades being exposed to allow free removal of air discharged from said air exhaust.

22. A system for prerotating an aircraft's landing gear wheel prior to landing, comprising:
- at least one landing gear wheel attached to the aircraft by a support;
- non-contact means for rotating said wheel at revolutional speeds while the aircraft is airborn, wherein said means for rotating is in close proximity to said wheel and is not in contact with said wheel to allow said wheel to rotate independently from said means for rotating; and
- means for measuring said revolutional speeds of said wheel comprising photoreflector on said wheel and a non-contact photosensor mounted apart from said wheel to generate an r.p.m. signal based on sensing the passing of said photoreflector; and
- control means including a microprocessor operable to read r.p.m. signals from said non-contact photosensor and wherein said microprocessor is programmed to send a control signal to said means for rotating said wheel to increase and decrease rotational speed of the wheel responsive to said r.p.m. signal wherein upon an excessively high r.p.m. signal said control signal causes a decrease in rotational speed of the wheel, and inversely upon an excessively low r.p.m. signal said control signal causes an increase in rotational speed of the wheel.

23. A fully automatic closed-loop control system for prerotating the landing gear wheels of an aircraft during approach and landing, retrofitable upon existing and operational aircraft, comprising:
- means for causing wheel assembly rotation, wherein wheel rotation is induced solely by force of high velocity air resistance experienced by the aircraft moving fast through the air, such high velocity air being controllably ducted and directed through variable air-intake actuating mechanisms against blades of impellers affixed to each wheel assembly;
- means for continuously measuring and transmitting the instantaneous true ground speed of the aircraft throughout approach and landing;
- means for independently and continuously sensing and transmitting the instantaneous rotational speed of each landing wheel assembly;
- means for independently and continuously controlling the amount of high-velocity air directed against each impeller of each landing wheel assembly, thereby independently increasing, sustaining or decreasing the instantaneous rotational velocity of each wheel assembly to achieve and maintain a peripheral velocity of each tire synchronous with instantaneous ground speed upon wheel touchdown;
- means for processing electrical signals from said means for transmitting ground speed and from said means for transmitting rotational speed of each landing wheel assembly, said means for processing and distributing appropriate electrical power of correct polarity and amplitude to all air-intake actuating mechanisms to each operate independently in true closed-loop servo mode.

* * * * *

UNITED STATES PATENT AND TRADEMARK OFFICE
CERTIFICATE OF CORRECTION

PATENT NO. : 5,104,063
DATED : April 14, 1992
INVENTOR(S) : James M. Hartley

It is certified that error appears in the above-identified patent and that said Letters Patent is hereby corrected as shown below:

In Column 4, at line 36, ""136"" should read --"139"--

In Column 14, at line 13, "groud" should read --ground--

Signed and Sealed this

Thirteenth Day of July, 1993

Attest:

MICHAEL K. KIRK

Attesting Officer        Acting Commissioner of Patents and Trademarks